April 12, 1966   R. J. PETERMAN   3,245,699
HOSE FITTING
Filed Jan. 28, 1963
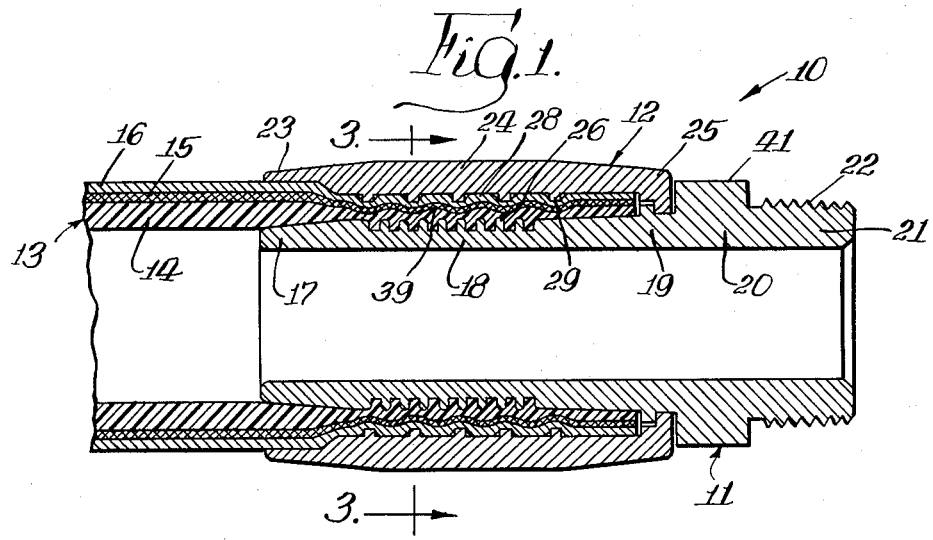
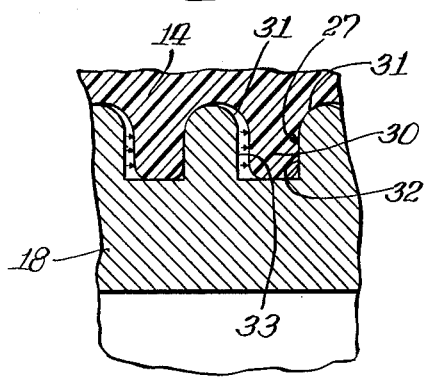
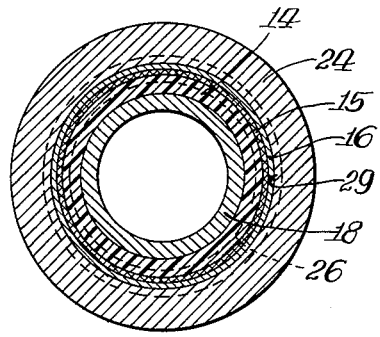
INVENTOR.
Robert J. Peterman,
BY
Hofgren, Wegner, Allen,
Stellman & McCord Atty's.

United States Patent Office 3,245,699
Patented Apr. 12, 1966

3,245,699
HOSE FITTING
Robert J. Peterman, Manitowoc, Wis., assignor to Imperial-Eastman Corporation, a corporation of Illinois
Filed Jan. 28, 1963, Ser. No. 254,098
4 Claims. (Cl. 285—110)

This invention relates to fittings and in particular to fittings for use with thermoplastic hose.

A serious problem arises in the use of thermoplastic hoses in that the conventional couplings, provided for coupling the host to other elements, may leak at certain times such as when the hose and coupling assembly is subjected to a negative temperature differential relative to the normal operating temperatures of the assembly. More specifically, it has been found that such assemblies may leak for a period of time when first used after a period of inactivity. Illustratively, in hydraulically operated apparatus employing such thermoplastic hose and coupling assemblies, the coupling may be effectively leak-tight during the normal use of the apparatus. However, after allowing the apparatus to remain idle such as overnight, it has been found that the assemblies tend to leak for a period of time such as ten minutes or so upon subsequent initiation of operation of the apparatus.

The present invention comprehends an improved fitting for use with such thermoplastic hose effectively eliminating this serious and vexatious problem. Thus, a principal object of the present invention is the provision of a new and improved fitting for use with thermoplastic hose.

Another object of the invention is the provision of such a fitting having new and improved means for maintaining a positive seal between the thermoplastic hose and the fitting notwithstanding a subjection of the hose and fitting assembly to a wide range of temperatures.

A further object of the invention is the provision of such a fitting having a new and improved insert structure providing a positive seal between the hose and insert notwithstanding the subjection thereof to a substantial range of temperatures.

Still another object of the invention is the provision of such a fitting wherein the insert is provided with an outer wall surface defining a radially outwardly opening annular groove having an axially outer radial planar surface portion, the groove having a depth-to-width ratio preselected as a function of the deformability of the hose to cause a portion of the hose to be disposed within the groove to be flexed axially outwardly by fluid forces acting axially outwardly thereagainst and resultingly cause the hose portion to sealingly engage the axially outer planar surface of the groove notwithstanding the subjection of the fitting to a substantial range of temperatures.

Still another object of the invention is provision of such a fitting wherein the groove has a depth greater than its width to cause a radially elongated annular portion of the hose to be disposed therein to be flexed against the sealing surface thereof.

Still another object of the invention is the provision of such a fitting wherein the groove is further provided with an outer rounded portion defining an entry to the groove precluding severing of the tube thereat by the compressive forces developed in the connection of the hose to the coupling.

A yet further object of the invention is the provision of such a fitting wherein a plurality of such grooves are provided in the insert being axially spaced therein, whereby the hose is sealingly connected to the insert at a plurality of axially spaced positions.

Other features and advantages of the invention will be apparent from the following description taken in connection with the accompanying drawing wherein:

FIGURE 1 is a diametric section of a fitting embodying the invention having a hose end connected thereto;

FIGURE 2 is a fragmentary enlarged diametric section illustrating a portion of the structure of FIGURE 1; and FIGURE 3 is a transverse section taken substantially along the line 3—3 of FIGURE 1.

In the exemplary embodiment of the invention as disclosed in the drawing, a fitting generally designated 10 is shown to comprise an insert member 11 and a cooperating retaining ring member 12. The fitting 10 is arranged for use with a thermoplastic hose generally designated 13 which in the illustrated embodiment comprises a multilayer hose having a thermoplastic inner tubular portion 14, a braid layer 15 overlying the inner portion 14, and a sheath 16 overlying the braid portion 15. The illustrated construction of hose 13 is exemplary only, the invention being applicable to all types of hose formed of a flexible material which exhibits a thermoplastic characteristic whereby a dimensional change in the hose body may occur as the result of a temperature differential.

More specifically, insert 11 comprises a tubular member formed of a rigid material such as brass. As shown in FIGURE 1, the insert may comprise an axially inner nose portion 17, a hose retaining portion 18 axially outwardly adjacent the nose portion 17, a connector portion 19 axially outwardly adjacent the hose retaining portion 18, a body portion 20 outwardly adjacent the connector portion 19 and provided with a plurality of hexagonally disposed flats 41 for engagement by a suitable tool such as a wrench in making up the fitting, and an axially outermost portion 21 provided with an external thread 22 for threaded connection to an element (not shown) to which the hose 13 is to be connected.

The retaining ring 12 comprises a tubular ring formed of a rigid material such as brass, having an axially inner nose portion 23, a hose retaining portion 24, and an axially outer connector portion 25 cooperating with insert connector portion 19 for retaining the insert and retaining ring in assembled relationship.

The radially outer surface 26 of the insert portion 18 is provided with a plurality of radially outwardly opening annular grooves 27. The radially inner surface 28 of the retaining ring 12 is provided with a plurality of radially inwardly extending annular projections 29. The spacing between surfaces 26 and 28 is made to be substantially less than the thickness of the hose 13 and thus, as best seen in FIGURE 1, the hose end is compressed therebetween to have radially elongated annular portions 30 thereof forced into the grooves 27 of the insert.

Referring now more specifically to FIGURE 2, the hose portions 30 define flexible extensions of the main body of the hose compressed in the space 39 between surfaces 26 and 28. The grooves 27 preferably have a depth to width ratio preselected as a function of the deformability of the hose 13 so that the extension portion 30 of the hose is sufficiently elongated within the grooves 27 to permit a flexing thereof axially outwardly, or to the right as seen in FIGURE 2, as a result of fluid pressure acting against the axially inner portion of the hose portion 30. In the illustrated embodiment the grooves 27 have a depth greater than the width thereof.

To preclude scoring or cutting of the inner surface of the hose 13, the outer portion 31 of the grooves 27 is preferably rounded to define a non-cutting entry to the grooves and ensuring a positive retention of the hose end in the fitting.

During normal use of the hose and fitting structure, wherein the hose and fitting structures are at normal, relative high temperatures, the hose portion 30 extending to within the grooves 27 substantially fully fill the grooves to have sealing engagement with the groove walls, thereby sealingly connecting the hose to the fitting. However, under certain conditions such as after periods of extended inactivity or where for other reasons the temperature of the hose end fitting assembly drops substantially, the thermoplastic material of the hose may tend to recede from this engagement with the groove surfaces thereby losing the seal resulting from the compression of the portion 30 within the groove. However, as best seen in FIGURE 2, when hydraulic pressure is applied within the hose, a flexing of the hose portion 30 occurs whereby portion 30 sealingly engages the axially outer surface portion 32 of the groove which, as shown in FIGURE 2, comprises a radially extending planar surface thereof. In the illustrated embodiment, surface portion 32 of the groove 27 has a depth over one-half the depth of the groove. Thus, the hydraulic forces acting on the extension 30 cause the extension 30 to have a positive sealed engagement with the sealing surface 32, effectively sealing the hose to the fitting notwithstanding the loss of a compressional seal of the hose material between the opposite groove wall surfaces.

In the illustrated embodiment the surface 33 of the groove 27 axially inwardly opposite the surface portion 32 similarly comprises a radial planar surface portion having a depth of at least one-half the depth of the groove. Thus, where temperature differentials are not to be encountered the groove arrangement 27 provides an improved positive sealing connection to the hose 13 as a result of the improved compressional force reaction between the hose and the groove walls.

In assembling the hose 13 to the fitting 11, the retaining ring 12 is first installed over the outer end of the hose, the ring being radially larger than in the arrangement illustrated in FIGURE 1. The hose end is then installed over the nose portion 17 and retaining portion 18 of the insert and the retaining ring 12 is then brought axially outwardly to cause the connecting portion 25 thereof to overlay the connecting portion 19 of the insert. The retaining ring is then constricted as by crimping to the configuration of FIGURE 1 whereupon the space 39 is caused to have a radial thickness substantially less than the thickness of the hose as shown in FIGURE 1 to develop the compressional forces in hose 13 providing the sealing securing of the hose to the fitting. As indicated above, the compression of the hose end in the space 39 causes the extension of portions 30 of the hose into the grooves 27 of the insert to provide the improved sealing of the hose to the insert as discussed above.

The fitting 10 is extremely simple and economical of construction while providing a positive sealed retention of the hose in association therewith. The fitting eliminates the serious and vexatious sealing problem found in the art occurring when the conventional fittings are employed with thermoplastic hoses over substantial temperature ranges.

While I have shown and described one embodiment of the invention it is to be understood that it is to be capable of many modifications. Changes, therefore, in the construction and arrangement may be made without departing from the spirit and scope of the invention.

I claim:
1. A fitting for coupling hose formed of a flexible thermoplastic material which shrinks when subjected to a drop in temperature, said fitting comprising: a tubular insert arranged to be disposed coaxially within the hose, said insert having a radially outer wall surface; and a constrictible retaining ring extending coaxially circumjacent said insert, said retaining ring having a radially inner wall surface spaced from and confronting said outer wall surface of said insert upon constriction of the retaining ring to define a compression space therebetween, said outer wall surface of said insert defining a plurality of radially outwardly opening annular grooves each being defined by axially inner and outer side walls and a radially inner bottom, the axially outer side walls having a radially inner radially extending planar surface portion having a radial extent at least half the radial depth of the grooves, said grooves having a depth-to-width ratio greater than 100 percent and preselected as a function of the deformability of the hose to cause a plurality of portions of the hose compressed between said surfaces in said space to extend substantially to said bottom of the grooves and be sealingly pressed between the side walls and against said bottom thereof at preselected operating temperatures and to recede from the groove surfaces upon a decrease in temperature from said preselected temperatures while maintaining a substantial portion in said grooves to be flexed axially outwardly by fluid forces acting axially outwardly thereagainst and resultingly sealingly engage said axially outer planar surface portion of the grooves at decreased temperatures of said fitting and hose, said side walls of the grooves being flared at the radial outer portion thereof.

2. The fitting of claim 1 wherein the axially inner side wall of each of said grooves includes an axially inner radially extending planar surface portion opposite to said radially inner, axially outer surface portion.

3. The fitting of claim 1 wherein said insert includes a cylindrical portion extending axially outwardly from the axially outer end of said plurality of grooves.

4. The fitting of claim 1 wherein said outer wall surface of the insert defines a convexly rounded surface between each pair of grooves.

References Cited by the Examiner

UNITED STATES PATENTS

| 2,278,239 | 3/1942 | Butler | 285—259 X |
| 2,319,586 | 5/1943 | Clench | 285—256 |
| 2,349,170 | 5/1944 | Jackman | 285—348 |
| 2,848,254 | 8/1958 | Millar | 285—149 |
| 2,865,094 | 12/1958 | Press | 285—259 |
| 2,926,029 | 2/1960 | St. Clair | 285—256 |

FOREIGN PATENTS

| 504,457 | 7/1954 | Canada. |
| 816,069 | 4/1937 | France. |
| 905,791 | 4/1945 | France. |
| 1,098,480 | 3/1955 | France. |
| 905,442 | 3/1954 | Germany. |
| 560,250 | 4/1957 | Italy. |
| 161,894 | 1/1958 | Sweden. |

CARL W. TOMLIN, *Primary Examiner.*